June 5, 1934.  E. C. FAUNTON  1,961,634
SHOCK ABSORBER
Original Filed May 5, 1930   3 Sheets-Sheet 1

INVENTOR
*E. C. FAUNTON*
BY
*B. Birkenbeuel*
ATTORNEY

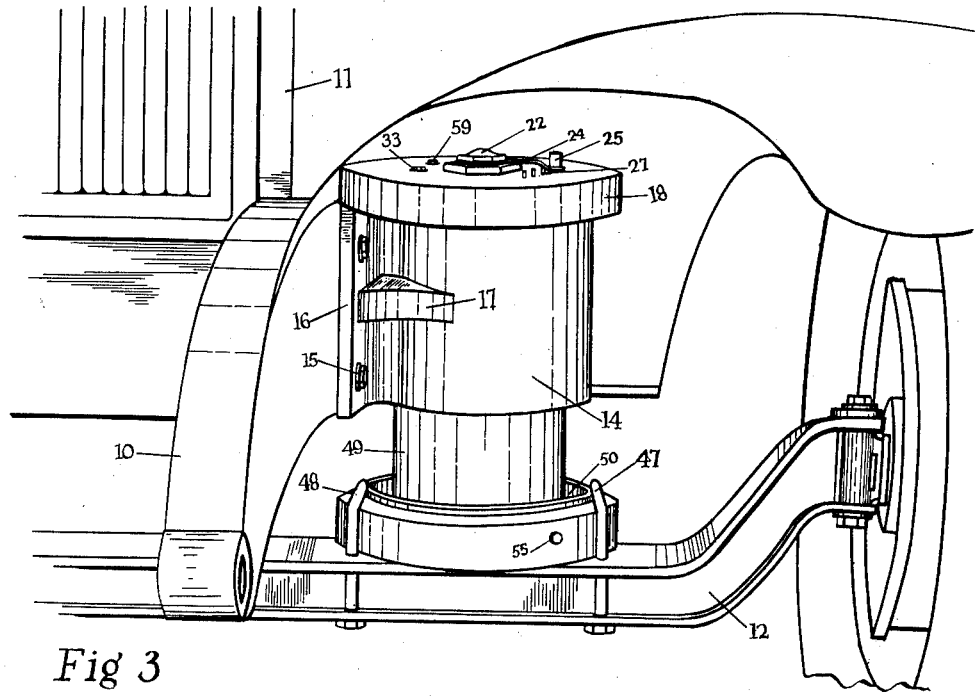
Fig 3
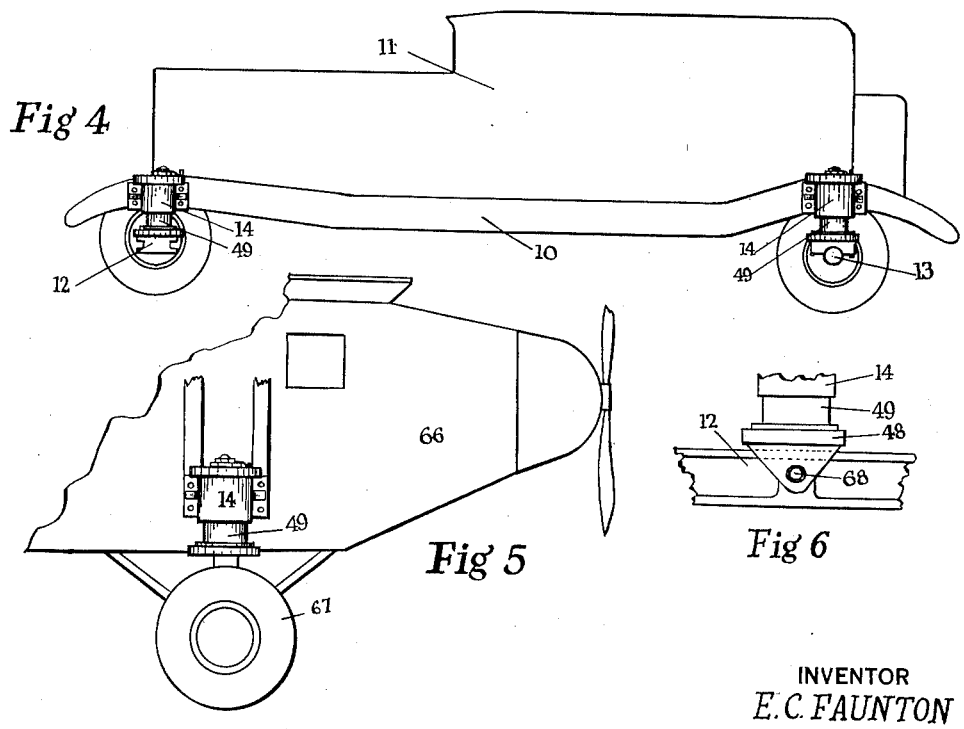
Fig 4
Fig 5
Fig 6
INVENTOR
E. C. FAUNTON
BY
ATTORNEY

Patented June 5, 1934

1,961,634

UNITED STATES PATENT OFFICE 1,961,634

SHOCK ABSORBER

Ellis C. Faunton, Portland, Oreg., assignor of one-fifth to B. Reingold, Portland, Oreg.

Application May 5, 1930, Serial No. 449,758
Renewed December 11, 1933

1 Claim. (Cl. 267—34)

This invention relates generally to shock absorbers, particularly with reference to land traveling vehicles and airplanes.

The main object of this invention is to provide an improved form of shock absorbing device which will dispense with the need of the ordinary type of flat spring commonly used for such purposes.

The second object is to provide a construction which will be shielded against rust, water and road splash.

The third object is to provide a spring construction which is continuously lubricated under pressure from the operating liquid medium.

The fourth object is to provide a spring construction of fixed pounds per foot compression, dimensioned and spaced between the circular winding coils so that the total depressible spacing is equal to the depressible distance or travel of the piston-like shields enclosing them.

The fifth object is to provide a shock absorbing device having a hydraulic compression and vacuum chamber arranged to prevent deterioration, due to the entrance of moisture or solid foreign substances.

The sixth object is to provide a shock absorber having a manual adjustment for the hydraulic vacuum and for the air compression.

The seventh object is to provide a spring construction with a connecting rod for limiting the rebound of the parts.

The eighth object is to provide a shock absorber in which an additional bottoming chamber is provided to prevent unusually severe jolts from causing the device to strike with undue force on its downward travel.

The ninth object is to prevent the leaning of the body of the vehicle when turning abrupt or sharp curves.

The tenth object is to provide an unbreakable spring construction in the shock absorber which is mounted in a bath of lubricant.

The eleventh object is to provide a spring construction which will not rattle and which will dispense with the use of shackles.

The twelfth object is to provide a shock absorbing spring construction easily adjustable for various loads.

The thirteenth object is to prevent the twist of the rear springs and variable torque pull on the drive shaft or propeller shaft from the transmission to the differential.

The fourteenth object is to provide a device which will be simple to manufacture and maintain in an operating condition and which will adapt itself to the modern tendency to reduce road clearances of automobiles.

These, and other objects, will become more apparent from the specification following as illustrated in the accompanying drawings, in which:

Figure 3 is a perspective view showing the device applied to the front axle of an automobile.

Figure 4 is a somewhat diagrammatic side elevation of the automobile showing the location of the front and rear shock absorbers.

Figure 5 is a fragmentary view of the front end of an air plane showing the device applied to the landing gear.

Figure 6 is a front elevation of a modified form of a support for the base 48.

Similar numbers of reference refer to similar parts throughout the several views.

Figure 1:
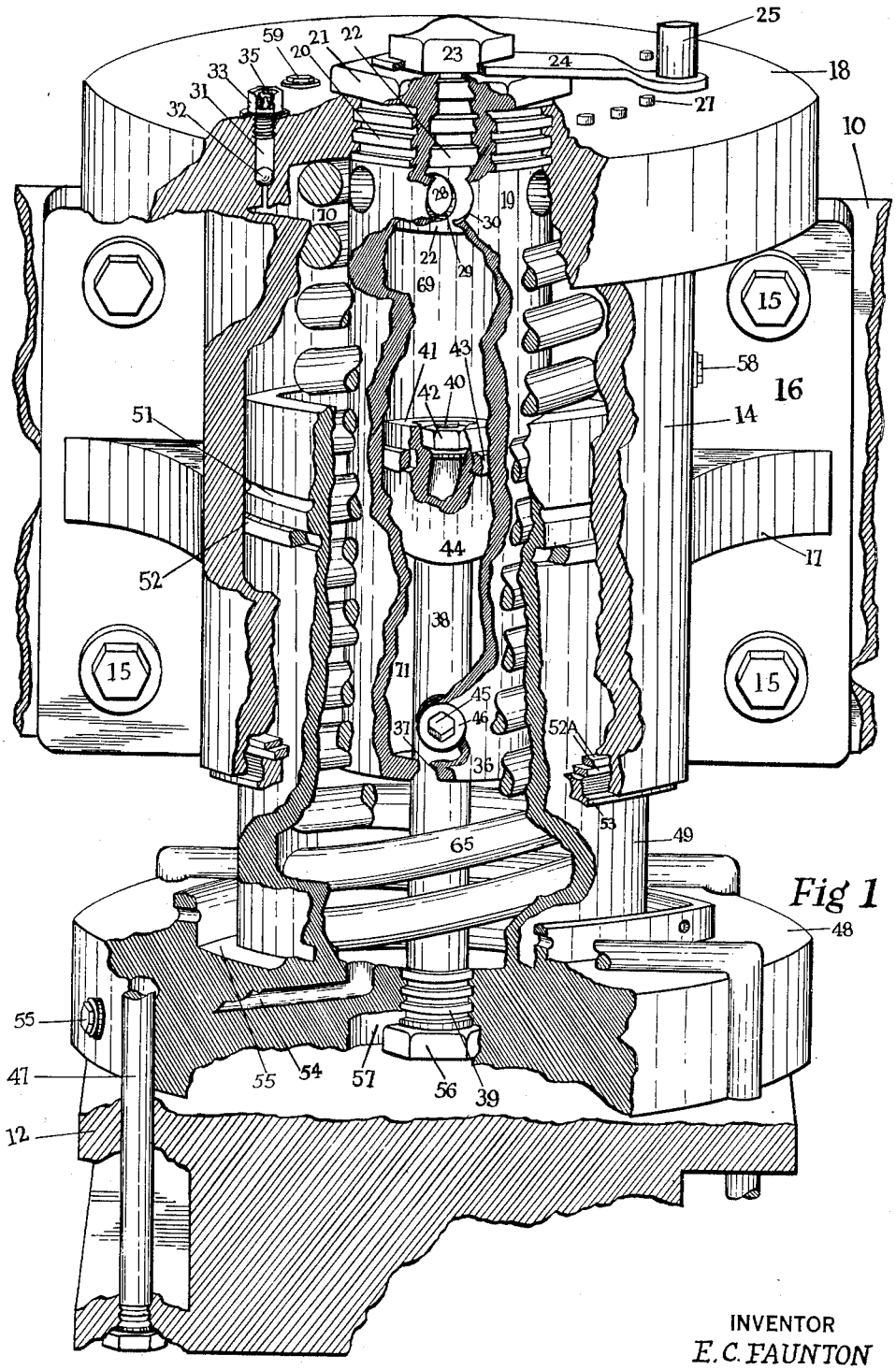
Figure 1 is a perspective view of the device with parts broken away in section.
Figure 2:
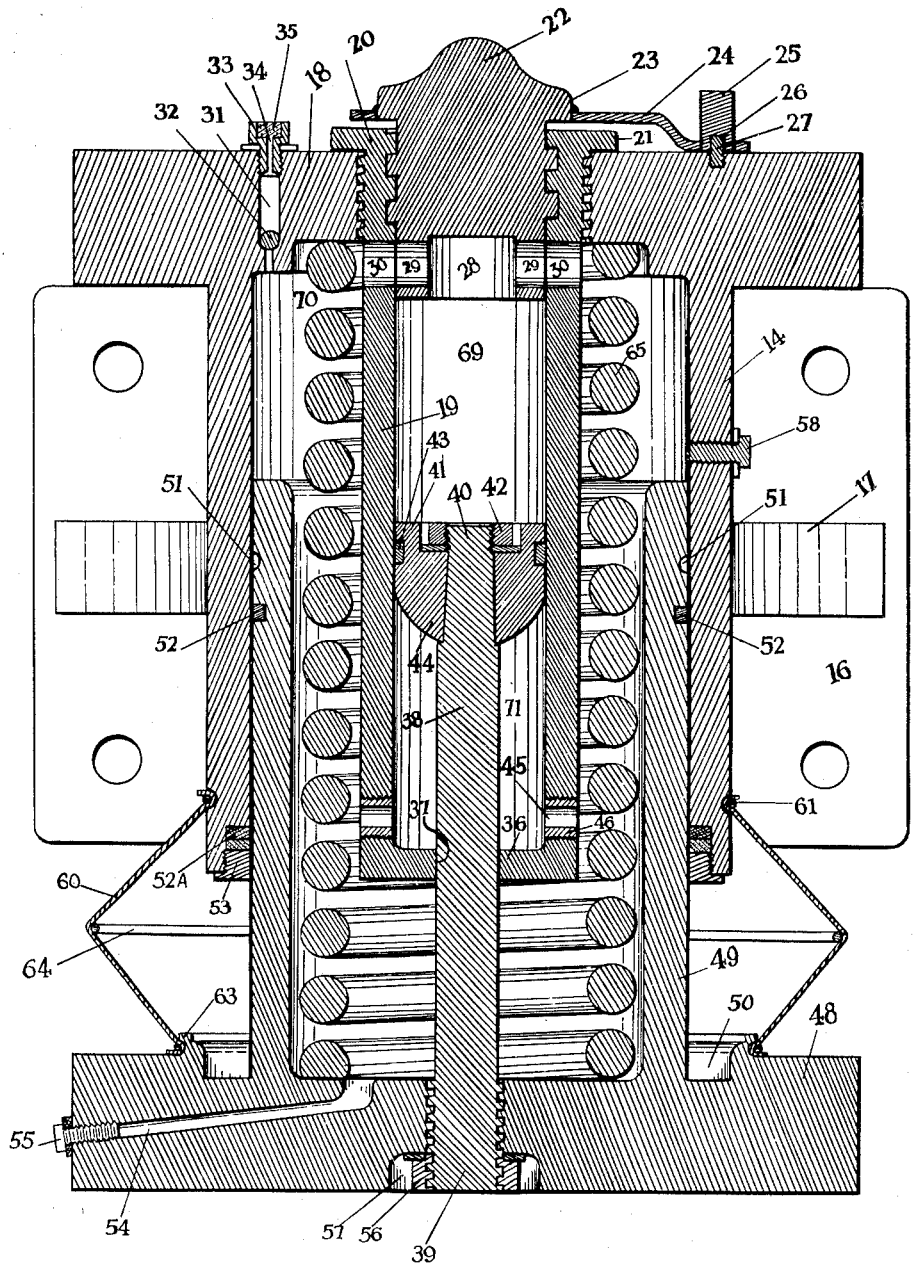
Figure 2 is a vertical section through the device.

In order to illustrate this invention there is shown the side frames 10 of an automobile chassis whose body 11 is diagrammatically outlined. Instead of employing the ordinary flat spring suspensions such as are in common use, there is interposed between the axles 12 and 13 of the automobile and the frame 10 my special shock absorbing device, including a cylinder 14 which is firmly secured to the frame 10 by means of the bolts 15 which pass through the base 16 which is integral with the cylinder 14. Stiffening ribs 17 are provided between the base 16 and the cylinder 14.

Extending downwardly through the head 18 of the cylinder 14 is an auxiliary cylinder 19 which is spaced from the interior of the cylinder 14 and has its upper end 20 flanged and threaded in order to permit same to be securely mounted concentrically with the cylinder 14. The flanged head 20 is preferably provided with flattened sides 21 to receive a wrench.

The auxiliary cylinder 19 is provided with a threaded plug 22 which forms a head at one end thereof. The plug 22 is provided with flattened sides 23 for a wrench 24 by means of which the position of the plug 22 with relation to the cylinder 19 can be varied. The outer end of the wrench 24 is provided with a handle 25 on whose under side is a recess 26 adapted to receive any one of the pins 27 which are threaded into the head 18. The lower end of the plug 22 is provided with a recess 28 from which radiate the passageways 29 which communicate with the ports 30 in the side of the cylinder 19. Obviously, any relative rotation between the plug 22 and the cylinder 19 will vary the amount of restriction to the flow of fluid through the ports 30.

Extending downwardly through the head 18 is an opening 31 whose lower end is of reduced size and has seated therein a ball 32 which serves as a check. In the upper end of the opening 31 is secured a hollow plug 33 having an outlet opening 34 and having its hollow portion filled with a fibrous filtering material 35, such as steel wool.

The lower end 36 of the cylinder 19 is closed, except for a central opening 37 through which passes a piston rod 38 whose lower end 39 is threaded and whose upper end 40 is tapered to receive a piston 41, which is secured in position by means of a nut 42. The piston 41 is provided with a ring 43 and its under side 44 is rounded. The lower end of the cylinder 19 is provided with ports 45 formed in threaded bushings 46. The openings in the bushings 46 are preferably non-circular, to permit the easy removal thereof.

Secured to the axle 12 by means of the U bolts 47 is the base 48 which forms the head of a hollow piston 49 around the base of which is formed an annular groove 50. An oil groove 51 and a snap ring 52 are provided on the outside of the piston 49. Compression packing 52–A is provided on the lower end of the cylinder 14 and is held in position by means of a retaining ring 53.

A drainage duct 54 is provided in the base 48 for the withdrawal of lubricant from the piston 49. The proper level of the liquid in the piston 49 is approximately the top line of the piston 49. A plug 55 is provided for the duct 54. The piston rod 38 is threaded into the base 48 and is secured by means of a nut 56 which occupies a recess 57 in the base 48.

It is desirable to provide a testing plug 58 in the side of the cylinder 14 which is removed when testing and oil is added through the opening of the filler cap 59 until it flows from the opening in the plug 58.

In order to prevent water and solid foreign substances from coming into contact with the working parts there is provided a leather boot 60 whose upper edge 61 occupies a groove in the cylinder 14, and the lower edge 62 fits into the out-turned rim 63 on the base 48. If desired an expanding ring 64 of wire can be employed to distend the intermediate portion of the boot 60.

Between the inner sides of the head 18 and the base 48 and occupying space between the inside of the piston 49 and the outside of the auxiliary cylinder 19 is the spring 65 which takes the place of the ordinary flat leaf car spring.

In Figure 5 is illustrated the fuselage 66 of an air plane whose landing gear 67 is provided with a shock absorbing cylinder 14 and piston 49 similar to those just described.

While I have illustrated this device in connection with the present day type of automobiles without in any way modifying the chassis or axle thereof other than to omit the springs, shackles and radius rods, it must be understood that I contemplate the design of the automobile to harmonize with the elements of my device, wherein the axle will be supported by means of a piston or slide on its under side, as well as on its upper side, for the purpose of eliminating any binding action which might be caused by the application of the brakes or acceleration of the car speed while the shock absorbing device was in operation.

While I have illustrated the base 48 as being rigidly bolted to the axle 12, it is desirable to provide same with a hinged base (as shown in Fig. 6) in which the axis of the pivot 68 is normal to the axle of the automobile in order to permit the functioning of the various units at different times and in different directions. Should an abnormal load be placed upon the device in a manner to cause the cylinder 14 to descend into the annular groove 50, this will serve as a dash pot to prevent the striking of the ring 53 in the bottom of the groove 50, due to entrapped air therein.

The operation of the device is as follows: Assuming that oil is maintained therein up to the level of the plug 58 and the device is being operated to support an automobile, as above described, it will be seen that the actual weight of the automobile is carried by the spring 65, and a sudden rise of the piston 49 or a drop of the cylinder 14, due to a road condition, will cause air to be compressed within the chamber 69 forcing same through the restricted ports 30 into the chamber 70.

It will be noted that while this is taking place there has been a reduction in the volume of oil contained within the piston 49 equaling the displacement of the piston 41, which piston has produced a partial vacuum on its under side, namely within the chamber 71, causing oil to be drawn from within the piston 49 through the ports 45 into the chamber 71. In other words, three factors have entered into the problem of resisting the suggested road shock—first the spring 65, second the compression side of the piston 41 as regulated by the ports 30, and third the suction side of the piston 41 as restricted by the ports 45.

As previously suggested, the groove 50 forms a cushion for the maximum movement of the parts. The rebound of the spring 65 is checked by the retarding action of the oil passing through the ports 45 throughout the full length of the rebound in an approximately uniform degree, and also in a varying manner by the compressed air within the chambers 69 and 70, the pressure of which varies from above atmospheric pressure on the downward travel to atmospheric pressure at the point of rest and below atmospheric pressure when the rebound of the spring 65 has raised its load above its normally raised position.

Due to the presence of the ball check 32 which serves as a breather, whenever the load is in a raised position the air pressure within the chambers 69 and 70 will correspond with the atmospheric pressure outside of the device. However, should a leakage of the oil or a pumping action set up within the device cause a change in the air pressure, this will be intermittently compensated by the movements of the ball 32, as can be clearly understood.

I claim:

In a shock absorbing device, the combination of an upright telescoping cylinder having liquid in the lower portion thereof and having a helical spring between the ends of said cylinder urging same apart, an auxiliary cylinder projecting concentrically downward from the top of said telescoping cylinder into the liquid containing portion thereof, said cylinder having externally controlled air ports near the upper end thereof communicating with the upper portion of said telescoping cylinder, said auxiliary cylinder having ports formed therein for the passage of liquid therethrough, an imperforate piston within said auxiliary cylinder between said air and liquid ports, a connecting rod between said imperforate piston and the lower end of said telescoping cylinder, a double check valve between the upper portion of said telescoping cylinder and the atmosphere for the purpose of preventing the escape of liquid therefrom and for the maintenance of an approximately uniform volume of air therein.

ELLIS C. FAUNTON.